(12) United States Patent
Kondo et al.

(10) Patent No.: US 11,108,043 B2
(45) Date of Patent: Aug. 31, 2021

(54) METHOD FOR PRODUCING POSITIVE ELECTRODE ACTIVE MATERIAL FOR NONAQUEOUS ELECTROLYTE SECONDARY BATTERY

(71) Applicant: SUMITOMO METAL MINING CO., LTD., Tokyo (JP)

(72) Inventors: Kentaro Kondo, Niihama (JP); Jun Yokoyama, Niihama (JP); Yuki Furuichi, Niihama (JP); Tetsufumi Komukai, Niihama (JP)

(73) Assignee: Sumitomo Metal Mining Co., Ltd.

( * ) Notice: Subject to any disclaimer, the term of this patent is extended or adjusted under 35 U.S.C. 154(b) by 70 days.

(21) Appl. No.: 16/661,632

(22) Filed: Oct. 23, 2019

(65) Prior Publication Data
US 2020/0058938 A1 Feb. 20, 2020

Related U.S. Application Data

(62) Division of application No. 15/539,786, filed as application No. PCT/JP2015/085303 on Dec. 17, 2015, now Pat. No. 10,497,936.

(30) Foreign Application Priority Data

Dec. 26, 2014 (JP) ................. 2014-264247
Oct. 28, 2015 (JP) ................. 2015-212403

(51) Int. Cl.
*H01M 4/525* (2010.01)
*H01M 4/36* (2006.01)
(Continued)

(52) U.S. Cl.
CPC ............ *H01M 4/525* (2013.01); *C01G 53/42* (2013.01); *H01M 4/366* (2013.01); *H01M 4/628* (2013.01);
(Continued)

(58) Field of Classification Search
CPC ...................................... C01G 53/42
See application file for complete search history.

(56) References Cited

U.S. PATENT DOCUMENTS

2010/0209771 A1 8/2010 Shizuka et al.

FOREIGN PATENT DOCUMENTS

JP 11-16566 1/1999
JP 2005-251716 9/2005
(Continued)

*Primary Examiner* — Peter F Godenschwager
(74) *Attorney, Agent, or Firm* — Gerald E. Hespos; Michael J. Porco; Matthew T. Hespos

(57) ABSTRACT

Provided is a method for producing a positive electrode active material for nonaqueous electrolyte secondary batteries, including: a water-washing step of mixing, with water, Li—Ni composite oxide particles represented by the formula: $Li_zNi_{1-x-y}Co_xM_yO_2$ and composed of primary particles and secondary particles formed by aggregation of the primary particles to water-wash it, and performing solid-liquid separation to obtain a washed cake; a mixing step of mixing a W compound powder free from Li with the washed cake to obtain a W-containing mixture; and a heat treatment step of heating the W-containing mixture, the heat treatment step including: a first heat treatment step of heating the W-containing mixture to disperse W on the surface of the primary particles; and subsequently, a second heat treatment step of heating it at a higher temperature than in the first heat treatment step to form a lithium tungstate compound on the surface of the primary particles.

9 Claims, 3 Drawing Sheets

(51) Int. Cl.
*H01M 4/62* (2006.01)
*C01G 53/00* (2006.01)
*H01M 10/052* (2010.01)
*H01M 4/02* (2006.01)

(52) U.S. Cl.
CPC ...... *C01P 2002/20* (2013.01); *C01P 2002/50* (2013.01); *C01P 2004/03* (2013.01); *C01P 2004/50* (2013.01); *C01P 2004/62* (2013.01); *C01P 2004/64* (2013.01); *C01P 2004/80* (2013.01); *C01P 2006/40* (2013.01); *H01M 10/052* (2013.01); *H01M 2004/028* (2013.01)

(56) References Cited

FOREIGN PATENT DOCUMENTS

| | | |
|---|---|---|
| JP | 2009-289726 | 12/2009 |
| JP | 2010-40383 | 2/2010 |
| JP | 2013-125732 | 6/2013 |
| JP | 2013-137947 | 7/2013 |
| JP | 2013-152866 | 8/2013 |

METHOD FOR PRODUCING POSITIVE ELECTRODE ACTIVE MATERIAL FOR NONAQUEOUS ELECTROLYTE SECONDARY BATTERY

The present application is a divisional application of U.S. patent application Ser. No. 15/539,786, filed Jun. 26, 2017, the contents of which are hereby incorporated by reference in their entirety.

BACKGROUND

1. Field of the Invention. The present invention relates to a positive electrode active material for nonaqueous electrolyte secondary batteries and a production method thereof, and a nonaqueous electrolyte secondary battery using the positive electrode active material.

2. Description of the Related Art. In recent years, with the wide adoption of portable electronic devices such as mobile phones and laptop computers, the development of small and lightweight secondary batteries having high energy density is strongly desired. Further, the development of high power secondary batteries as batteries for electric cars including hybrid cars is strongly desired.

Examples of secondary batteries satisfying such demands include nonaqueous electrolyte secondary batteries typified by lithium ion secondary batteries. Such lithium ion secondary batteries are composed of a negative electrode, a positive electrode, an electrolyte, etc., and materials capable of intercalation and deintercalation of lithium ions are used for the active materials of the negative electrode and the positive electrode.

The nonaqueous electrolyte lithium ion secondary batteries are now being actively studied and developed. Above all, lithium ion secondary batteries using a layered or spinel lithium-nickel composite oxide as a positive electrode material allow a high voltage of 4-V class to be obtained, and therefore are being put into practical use as batteries having high energy density.

Main examples of materials proposed so far include lithium cobalt composite oxide ($LiCoO_2$) that is comparatively easily synthesized, lithium nickel composite oxide ($LiNiO_2$) using nickel that is less expensive than cobalt, lithium nickel cobalt manganese composite oxide ($LiNi_{1/3}Co_{1/3}Mn_{1/3}O_2$), and lithium manganese composite oxide ($LiMn_2O_4$) using manganese.

Among these, lithium-nickel composite oxide is gaining attention as a material having good cycle characteristics and low resistance and allowing high power to be obtained, where the resistance reduction that is necessary for power enhancement has been regarded as being important in recent years.

As a method for achieving the aforementioned resistance reduction, addition of different elements is used, and transition metals capable of having high valence such as W, Mo, Nb, Ta, and Re are considered to be useful, in particular.

For example, Japanese Patent Laid-Open No. 2009-289726 proposes a lithium transition metal compound powder for lithium secondary battery positive electrode materials containing one or more elements selected from Mo, W, Nb, Ta, and Re in an amount of 0.1 to 5 mol % with respect to the total molar amount of Mn, Ni, and Co, where the total atomic ratio of Mo, W, Nb, Ta, and Re with respect to the total of Li and the metal elements other than Mo, W, Nb, Ta, and Re on the surface portions of primary particles is preferably 5 times or more the atomic ratio of the whole primary particles.

According to this proposal, it is considered that the cost reduction, high safety, high load characteristics, and improvement in powder handleability of the lithium transition metal compound powder for lithium secondary battery positive electrode materials can be achieved all together.

However, the aforementioned lithium transition metal compound powder is obtained by pulverizing a raw material in a liquid medium, spray drying a slurry in which the pulverized materials are uniformly dispersed, and firing the obtained spray-dried material. Therefore, some of different elements such as Mo, W, Nb, Ta, and Re are substituted with Ni disposed in layers, resulting in a reduction in battery characteristics such as battery capacity and cycle characteristics, which has been a problem.

Further, Japanese Patent Laid-Open No. 2005-251716 proposes a positive electrode active material for nonaqueous electrolyte secondary batteries having at least a lithium transition metal composite oxide with a layered structure, wherein the lithium transition metal composite oxide is present in the form of particles composed of either or both of primary particles and secondary particles as aggregates of the primary particles, and wherein the particles have a compound including at least one selected from the group consisting of molybdenum, vanadium, tungsten, boron, and fluorine at least on the surface.

With that, it is claimed that the positive electrode active material for nonaqueous electrolyte secondary batteries having excellent battery characteristics even in more severe use environment is obtained, and that the initial characteristics are improved without impairing the improvement in thermostability, load characteristics, and output characteristics particularly by having the compound including at least one selected from the group consisting of molybdenum, vanadium, tungsten, boron, and fluorine on the surface of the particles.

However, the effect by adding the at least one element selected from the group consisting of molybdenum, vanadium, tungsten, boron, and fluorine is to improve the initial characteristics, that is, the initial discharge capacity and the initial efficiency, where the output characteristics are not mentioned. Further, according to the disclosed production method, the firing is performed while the additive element is mixed with a heat-treated hydroxide together with a lithium compound, and therefore the additive element is partially substituted with nickel disposed in layers to cause a reduction in battery characteristics, which has been a problem.

Further, Japanese Patent Laid-Open No. H11-16566 proposes a positive electrode active material in which the circumference of the positive electrode active material is coated with a metal containing at least one selected from Ti, Al, Sn, Bi, Cu, Si, Ga, W, Zr, B, and Mo and/or an intermetallic compound obtained by combining a plurality of these elements, and/or an oxide.

It is claimed that such coating can ensure the safety by absorbing oxygen gas, but there is no disclosure on the output characteristics. Further, the disclosed production method involves coating using a planetary ball mill, and such a coating method causes physical damage on the positive electrode active material, resulting in a reduction in battery characteristics.

Further, Japanese Patent Laid-Open No. 2010-40383 proposes a positive electrode active material heat-treated while a tungstate compound is deposited on composite oxide particles mainly composed of lithium nickelate and having a carbonate ion content of 0.15 weight % or less.

According to this proposal, since the tungstate compound or a decomposition product of the tungstate compound is present on the surface of the positive electrode active material, and the oxidation activity on the surface of the composite oxide particles during charge is suppressed, gas generation due to the decomposition of the nonaqueous electrolyte or the like can be suppressed, but there is no disclosure on the output characteristics.

Further, the disclosed production method is to deposit a solution in which a sulfuric acid compound, a nitric acid compound, a boric acid compound, or a phosphate compound serving as a deposition component is dissolved in a solvent together with the tungstate compound, on the composite oxide particles that are preferably heated to at least the boiling point of the solution in which the deposition component is dissolved, where the solvent is removed within a short time, and therefore the tungsten compound is not sufficiently dispersed on the surface of the composite oxide particles and is not uniformly deposited, which has been a problem.

Further, improvements in power enhancement by lithium nickel composite oxide have also been made.

For example, Japanese Patent Laid-Open No. 2013-125732 proposes a positive electrode active material for nonaqueous electrolyte secondary batteries having fine particles containing lithium tungstate represented by any one of $Li_2WO_4$, $Li_4WO_5$, and $Li_6W_2O_9$ on the surface of a lithium-nickel composite oxide composed of primary particles and secondary particles formed by aggregation of the primary particles, where high power is supposed to be obtained together with high capacity.

Although the power is enhanced while the high capacity is maintained, further enhancement in capacity is required.

In view of such problems, it is an object of the present invention to provide a positive electrode active material for nonaqueous electrolyte secondary batteries which allows high power together with high capacity to be obtained when used as a positive electrode material.

SUMMARY

As a result of diligent studies on the powder characteristics of lithium-nickel composite oxide used as a positive electrode active material for nonaqueous electrolyte secondary batteries and the effect thereof on the positive electrode resistance of the battery, for solving the aforementioned problems, the inventors have found that the positive electrode resistance of the battery can be reduced and the output characteristics of the battery can be improved by forming lithium tungstate compound on the surface of primary particles constituting the lithium-nickel composite oxide powder.

Further, as a production method thereof, they have found that the lithium tungstate compound can be formed on the surface of the primary particles of the lithium-nickel composite oxide by washing the lithium-nickel composite oxide with water and mixing a tungsten compound with the washed cake, followed by heat-treating the mixture, thereby accomplishing the present invention.

More specifically, the first aspect of the present invention is a method for producing a positive electrode active material for nonaqueous electrolyte secondary batteries, including: a water washing step of mixing, with water, a lithium-nickel composite oxide powder represented by the general formula $Li_zNi_{1-x-y}Co_xM_yO_2$ (where $0 \leq x \leq 0.35$, $0 \leq y \leq 0.35$, and $0.95 \leq z \leq 1.30$ are satisfied, and M is at least one element selected from Mn, V, Mg, Mo, Nb, Ti, and Al) and having a layered crystal structure composed of primary particles and secondary particles formed by aggregation of the primary particles to form a slurry, and washing the lithium-nickel composite oxide powder with the water, and then subjecting the slurry to solid-liquid separation to obtain a washed cake constituted by washed lithium-nickel composite oxide particles; a mixing step of mixing a tungsten compound powder not containing lithium with the washed cake to obtain a tungsten-containing mixture; and a heat treatment step of heat-treating the obtained tungsten-containing mixture, wherein the heat treatment step includes: a first heat treatment step of heat-treating the tungsten-containing mixture to allow a lithium compound present on the surface of the primary particles of the washed lithium-nickel composite oxide to react with the tungsten compound so as to dissolve the tungsten compound therein, thereby forming lithium-nickel composite oxide particles with tungsten dispersed on the surface of the primary particles; and subsequent to the first heat treatment step, a second heat treatment step of performing heat treatment at a higher temperature than in the first heat treatment step to form lithium-nickel composite oxide particles with a lithium tungstate compound formed on the surface of the primary particles of the lithium-nickel composite oxide.

The second aspect of the present invention is the method for producing a positive electrode active material for nonaqueous electrolyte secondary batteries according to the first aspect, wherein the slurry in the water washing step has a concentration of 500 to 2500 g/L.

The third aspect of the present invention is the method for producing a positive electrode active material for nonaqueous electrolyte secondary batteries according to the first and second aspects, wherein the slurry in the water washing step has a temperature of 20 to 30° C.

The fourth aspect of the present invention is the method for producing a positive electrode active material for nonaqueous electrolyte secondary batteries according to the first to third aspects, wherein the washed cake obtained in the water washing step has a water content controlled to 3.0 to 15.0 mass %.

The fifth aspect of the present invention is the method for producing a positive electrode active material for nonaqueous electrolyte secondary batteries according to the first to fourth aspects, wherein the tungsten compound not containing lithium used in the mixing step is tungsten oxide ($WO_3$) or tungstic acid ($WO_3 \cdot H_2O$).

The sixth aspect of the present invention is the method for producing a positive electrode active material for nonaqueous electrolyte secondary batteries according to the first to fifth aspects, wherein the amount of tungsten contained in the tungsten-containing mixture is 0.05 to 2.0 at % with respect to the total number of atoms of Ni, Co, and M contained in the lithium-nickel composite oxide particles.

The seventh aspect of the present invention is the method for producing a positive electrode active material for nonaqueous electrolyte secondary batteries according to the first to sixth aspects, wherein the heat treatment step is performed in any one atmosphere of decarbonated air, inert gas, and vacuum.

The eighth aspect of the present invention is the method for producing a positive electrode active material for nonaqueous electrolyte secondary batteries according to the first to seventh aspects, wherein the first heat treatment step is performed at a heat treatment temperature of 60 to 80° C.

The ninth aspect of the present invention is the method for producing a positive electrode active material for nonaqueous electrolyte secondary batteries according to the first to eighth aspects, wherein the second heat treatment step is performed at a heat treatment temperature of 100 to 200° C.

The tenth aspect of the present invention is a positive electrode active material for nonaqueous electrolyte secondary batteries constituted by a lithium-nickel composite oxide powder having a layered crystal structure composed of primary particles and secondary particles formed by aggregation of the primary particles, the positive electrode active material being represented by the general formula: $Li_zNi_{1-x-y}Co_xM_yW_aO_{2+\alpha}$ (where $0 \leq x \leq 0.35$, $0 \leq y \leq 0.35$, $0.95 \leq z \leq 1.30$, $0 < a \leq 0.03$, and $0 \leq \alpha \leq 0.15$ are satisfied, and M is at least one element selected from Mn, V, Mg, Mo, Nb, Ti, and Al), wherein lithium tungstate is present on a surface of the primary particles of the lithium-nickel composite oxide, and the amount of lithium contained in a lithium compound other than the lithium tungstate present on the surface of the primary particles of the lithium-nickel composite oxide compound is 0.05 mass % or less with respect to the total amount of the positive electrode active material.

The eleventh aspect of the present invention is the positive electrode active material for nonaqueous electrolyte secondary batteries according to the tenth aspect, wherein the amount of tungsten contained in the positive electrode active material is 0.05 to 2.0 at % with respect to the total number of atoms of Ni, Co, and M contained in the lithium-metal composite oxide powder.

The twelfth aspect of the present invention is the positive electrode active material for nonaqueous electrolyte secondary batteries according to the tenth aspect and the eleventh aspect, wherein the lithium tungstate is present on the surface of the primary particles of the lithium-metal composite oxide as fine particles having a particle size of 1 to 500 nm.

The thirteenth aspect of the present invention is the positive electrode active material for nonaqueous electrolyte secondary batteries according to the tenth aspect and the eleventh aspect, wherein the lithium tungstate is present on the surface of the primary particles of the lithium-metal composite oxide as coating films having a film thickness of 1 to 200 nm.

The fourteenth aspect of the present invention is the positive electrode active material for nonaqueous electrolyte secondary batteries according to the tenth aspect and the eleventh aspect, wherein the lithium tungstate is present on the surface of the primary particles of the lithium-metal composite oxide in both forms of fine particles having a particle size of 1 to 500 nm and coating films having a film thickness of 1 to 200 nm.

The fifteenth aspect of the present invention is the positive electrode active material for nonaqueous electrolyte secondary batteries according to the tenth to fourteenth aspects, wherein the content of sulfate radical is 0.05 mass % or less.

The sixteenth aspect of the present invention is a nonaqueous electrolyte secondary battery having a positive electrode that includes the positive electrode active material for nonaqueous electrolyte secondary batteries obtained according to the tenth to fifteenth aspects.

Advantageous Effects of Invention

According to the present invention, a positive electrode active material for nonaqueous electrolyte secondary batteries which can achieve high power together with high capacity and has good cycle characteristics when used as a positive electrode material of a battery is obtained. Further, the production method is easy and suitable for production on an industrial scale, and the industrial value is exceptionally large.

DETAILED DESCRIPTION

Figure 1:
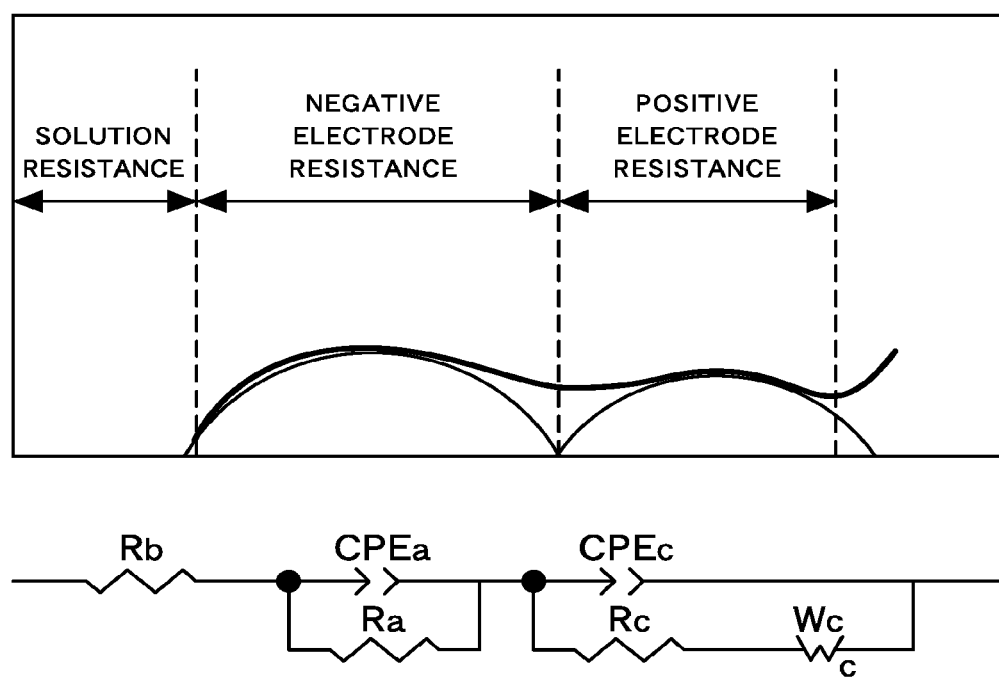
FIG. 1 is a schematic illustration of an equivalent circuit used for measurement examples of impedance evaluation and analysis.

Hereinafter, for the present invention, a positive electrode active material for nonaqueous electrolyte secondary batteries of the present invention will be first described, and thereafter a production method thereof and a nonaqueous electrolyte secondary battery using the positive electrode active material of the present invention will be described.
(1) Positive Electrode Active Material for Nonaqueous Electrolyte Secondary Batteries The positive electrode active material for nonaqueous electrolyte secondary batteries (which may be hereinafter referred to simply as positive electrode active material) of the present invention is constituted by a lithium-nickel composite oxide powder having a layered crystal structure composed of primary particles and secondary particles formed by aggregation of the primary particles, wherein the composition of the positive electrode active material is represented by the general formula: $Li_zNi_{1-x-y}Co_xM_yW_aO_{2+\alpha}$ (where $0 \leq x \leq 0.35$, $0 \leq y \leq 0.35$, $0.95 \leq z \leq 1.30$, $0 < a \leq 0.03$, and $0 \leq \alpha \leq 0.15$ are satisfied, and M is at least one element selected from Mn, V, Mg, Mo, Nb, Ti, and Al), lithium tungstate is present on a surface of the primary particles of the lithium-nickel composite oxide, and the amount of lithium contained in a lithium compound other than the lithium tungstate present on the surface of the primary particles is 0.05 mass % or less with respect to the total amount of the positive electrode active material.

In the present invention, high charge-discharge capacity is obtained by using the lithium-nickel composite oxide having a composition represented by the general formula: $Li_zNi_{1-x-y}Co_xM_yO_2$ (where $0 \leq x \leq 0.35$, $0 \leq y \leq 0.35$, and $0.95 \leq z \leq 1.30$ are satisfied, and M is at least one element selected from Mn, V, Mg, Mo, Nb, Ti, and Al) as a base material. For obtaining higher charge-discharge capacity, $x+y \leq 0.2$ and $0.95 \leq z \leq 1.10$ are preferably satisfied in the aforementioned the formula.

Further, the base material is in the form of a lithium-metal composite oxide powder constituted by primary particles and secondary particles formed by aggregation of the primary particles (hereinafter, the secondary particles and the primary particles existing alone may be referred to collectively as "lithium-metal composite oxide particles"), where lithium tungstate is present on the surface of the primary particles of the lithium-nickel composite oxide, and the amount of lithium contained in a lithium compound other than the lithium tungstate present on the surface of the primary particles of the lithium-nickel composite oxide is 0.05 mass % or less with respect to the total amount of the positive electrode active material, thereby improving the output characteristics and further improving the cycle characteristics while maintaining the charge-discharge capacity.

Generally, when the surface of the positive electrode active material is completely coated with a different compound, the movement (intercalation) of lithium ions is significantly limited, and therefore high capacity that is an advantage of lithium nickel composite oxide is eventually offset.

In contrast, in the present invention, lithium tungstate (which may be hereinafter referred to as "LWO") is formed on the surface of the primary particles on the surface and inside of the lithium-nickel composite oxide particles, and the LWO has high lithium ion conductivity and has an effect of promoting the movement of lithium ions. Therefore, the LWO is formed on the surface of the primary particles of the lithium-nickel composite oxide, thereby forming Li conduction paths at the interface with the electrolyte, so that the reaction resistance of the positive electrode active material (which may be hereinafter referred to as "positive electrode resistance") is reduced to improve the output characteristics.

Thus, the reduction in positive electrode resistance reduces the voltage to be lost in the battery, and the voltage actually applied to the load side is relatively increased, thereby allowing high power to be obtained. Further, the increase in the voltage applied to the load side allows lithium to be sufficiently inserted into and removed from the positive electrode, and therefore the charge-discharge capacity of the battery (which may be hereinafter referred to as "battery capacity") is also improved.

Here, in the case where only the surface of the secondary particles of the positive electrode active material is coated with a layered material, the specific surface area decreases, regardless of the coating thickness, and therefore even if the coating material has high lithium ion conductivity, the contact area with the electrolyte is reduced. Further, when the layered material is formed, the compound tends to be formed concentrically on a specific particle surface.

Accordingly, although the effects of improving the charge-discharge capacity and reducing the positive electrode resistance are obtained due to high lithium ion conductivity of the layered material serving as the coating material, they are not sufficient, leaving room for improvement.

Further, the contact with the electrolyte occurs on the surface of the primary particles, and therefore it is important that LWO be formed on the surface of the primary particles.

Here, the surface of the primary particles in the present invention include the surface of the primary particles exposed on the outer surface of the secondary particles, and the surface of the primary particles exposed into voids in the vicinity of the surface of the secondary particles and inside thereof communicating with the outside of the secondary particles so as to allow the electrolyte to penetrate therethrough. Further, the surface of the primary particles includes even the grain boundaries between the primary particles if the primary particles are not perfectly bonded, and the electrolyte can penetrate therethrough.

The contact with the electrolyte occurs not only on the outer surface of the secondary particles constituted by aggregation of the primary particles but also in the voids in the vicinity of the surface of the secondary particles and inside thereof and further at the aforementioned imperfect grain boundaries, and therefore it is necessary to form LWO also on the surface of the primary particles to promote the movement of lithium ions.

Thus, the reaction resistance of the positive electrode active material can be further reduced by forming LWO more on the surface of the primary particles which can contact with the electrolyte.

Accordingly, for obtaining higher effect of reducing the positive electrode resistance, LWO is preferably present on the surface of the primary particles as fine particles having a particle size of 1 to 500 nm.

The contact area with the electrolyte is rendered sufficient by having such a form, so that the lithium ion conductivity can be effectively improved, thereby allowing the reaction resistance of the positive electrode to be more effectively reduced and the charge-discharge capacity to be improved.

When the particle size is less than 1 nm, the fine particles may fail to have sufficient lithium ion conductivity in some cases. Further, if the particle size is over 500 nm, the formation of the fine particles on the surface of the primary particles may be non-uniform, resulting in failure to sufficiently obtain the effect of reducing the reaction resistance. For forming the fine particles uniformly on the surface of the primary particles to obtain a higher effect, the particle size of the fine particles is more preferably 1 to 300 nm, further preferably 5 to 200 nm.

Here, LWO is not necessarily completely formed on the entire surface of the primary particles and may be scattered.

Even when scattered, the effect of reducing the reaction resistance is obtained as long as LWO is formed on the surface of the primary particles exposed on the outer surface and inside of the lithium-nickel composite oxide particles. Further, not all of the fine particles are necessarily present as fine particles having a particle size of 1 to 500 nm, and a high effect is obtained when 50% or more of the number of the fine particles formed on the surface of the primary particles are preferably formed to have a particle size in the range of 1 to 500 nm.

Meanwhile, when the surface of the primary particles is coated with a thin film, Li conduction paths can be formed at the interface with the electrolyte, while the reduction in specific surface area is suppressed, and higher effects of improving the charge-discharge capacity and reducing the reaction resistance are obtained. In the case where the surface of the primary particles are coated with LWO in the form of thin films as above, LWO is preferably present on the surface of the primary particles of the lithium-metal composite oxide as coating films with a film thickness of 1 to 200 nm. For enhancing the effect, the film thickness is more preferably 1 to 150 nm, further preferably 1 to 100 nm.

When the film thickness is less than 1 nm, the coating films may fail to have sufficient lithium ion conductivity in some cases. Further, when the film thickness is over 200 nm, the lithium ion conductivity is reduced, which may result in failure to obtain a higher effect of reducing the reaction resistance in some cases.

However, such coating film may be partially formed on the surface of the primary particles, and the whole coating film does not need to have a film thickness in the range of 1 to 200 nm. When the coating film with a film thickness of 1 to 200 nm is formed at least partially on the surface of the primary particles, a high effect is obtained.

Further, also in the case where LWO is formed on the surface of the primary particles is the form of fine particles as well as in the form of a coating thin film, a high effect on the battery characteristics is obtained.

Such properties of the surface of the primary particles of the lithium-nickel composite oxide can be determined, for example, by observation using a field emission scanning electron microscope or a transmission electron microscope, and it has been confirmed that the lithium tungstate is formed on the surface of the primary particles of the lithium-nickel composite oxide of the positive electrode active material for nonaqueous electrolyte secondary batteries of the present invention.

Meanwhile, in the case where LWO is non-uniformly formed between the lithium-nickel composite oxide particles, the movement of lithium ions between the lithium-nickel composite oxide particles is rendered non-uniform, and therefore a load is applied onto some specific lithium-nickel composite oxide particles, which tends to cause a deterioration in cycle characteristics and an increase in reaction resistance.

Accordingly, LWO is preferably uniformly formed also between the lithium-nickel composite oxide particles.

Further, in the positive electrode active material of the present invention, the amount of lithium contained in a lithium compound other than the lithium tungstate present on the surface of the primary particles (which will be hereinafter referred to as excess amount of lithium) is 0.05 mass % or less, preferably 0.03 mass % or less, with respect to the total amount of the positive electrode active material.

High charge-discharge capacity and high output characteristics are obtained and the cycle characteristics are improved by regulating the excess amount of lithium as above.

Lithium hydroxide and lithium carbonate are present on the surface of the primary particles of the lithium-nickel composite oxide particles, other than the lithium tungstate, and such a lithium compound, the abundance of which can be expressed as the excess amount of lithium, has poor conductivity of lithium and inhibits the movement of lithium ions from the lithium-nickel composite oxide.

Thus, the reduction of the excess amount of lithium can enhance the effect of promoting the movement of lithium ions by the lithium tungstate and reduce the load on the lithium-nickel composite oxide during charging and discharging, thereby improving the cycle characteristics.

Further, the control of the excess amount of lithium can make the movement of lithium ions between the lithium-nickel composite oxide particles uniform and can suppress the application of load on specific lithium-nickel composite oxide particles, thereby improving the cycle characteristics.

An excessive reduction of the excess lithium means that lithium is excessively extracted from the crystals of the lithium-nickel composite oxide particles in forming the lithium tungstate. Accordingly, for suppressing a reduction in battery characteristics, the excess amount of lithium is preferably 0.01 mass % or more.

Further, the content of sulfate radical (sulfate group) (which may be referred to also as sulfate group content) in the positive electrode active material is preferably 0.05 mass % or less, more preferably 0.025 mass % or less, further preferably 0.020 mass % or less.

If the content of sulfate radical in the positive electrode active material is over 0.05 mass %, an extra amount of a negative electrode material corresponding to the irreversible capacity of the positive electrode active material is inevitably used for a battery in the construction of the battery, resulting in a reduction in capacities both per weight and per volume of the entire battery, and a safety problem due to excess lithium stored in the negative electrode as an irreversible capacity, which is therefore not preferable. Further, the lower limit of the content of sulfate radical in the positive electrode active material is not specifically limited, but is, for example, 0.001 mass % or more.

The content of sulfate radical can be determined by IPC emission spectroscopy (ICP method) and expressing the measured amount of S (sulfur element) in terms of the amount of sulfate radical ($SO_4$).

The amount of tungsten contained in the lithium tungstate is 3.0 at % or less, preferably 0.05 to 2.0 at %, more preferably 0.08 to 1.0 at %, with respect to the total number of atoms of Ni, Co, and M contained in the lithium-nickel composite oxide. The effect of improving the output characteristics is obtained by adding 3.0 at % or less of tungsten.

Further, when the amount of tungsten is 0.05 to 2.0 at %, the amount of LWO to be formed is made sufficient to reduce the positive electrode resistance and can sufficiently ensure the surface area of the primary particles capable of contacting with the electrolyte, and both high charge-discharge capacity and high output characteristics can be further achieved.

When the amount of tungsten is less than 0.05 at %, the effect of improving the output characteristics may fail to be sufficiently obtained, and when the amount of tungsten is over 2.0 at %, the amount of the compound formed excessively increases to inhibit the conduction of lithium ions between the lithium-nickel composite oxide and the electrolyte, which may result in a reduction in charge-discharge capacity.

Further, as the amount of lithium in the entire positive electrode active material, the atomic ratio "Li/Me" of the number of atoms of Li with respect to the sum of the number of atoms of Ni, Co, and M in the positive electrode active material (Me) is 0.95 to 1.30, preferably 0.97 to 1.25, more preferably 0.97 to 1.20. Thus, the ratio Li/Me in the lithium-metal composite oxide particles as a core material is set to preferably 0.95 to 1.25, more preferably 0.95 to 1.20, thereby allowing high battery capacity to be obtained and allowing the amount of lithium that is sufficient to form LWO to be ensured. Here, the core material refers to the lithium-metal composite oxide particles excluding the LW compound, and the positive electrode active material is obtained by forming the LW compound on the surface of the primary particles of the lithium-metal composite oxide particles.

When the ratio Li/Me is less than 0.95, the reaction resistance of the positive electrode in the nonaqueous electrolyte secondary battery using the obtained positive electrode active material increases, and thus the output of the battery decreases. Further, when the ratio Li/Me is over 1.30, the initial discharge capacity of the positive electrode active material decreases, and the reaction resistance of the positive electrode increases as well. The content of lithium in the LWO is supplied from the lithium-nickel composite oxide particles serving as the base material, and therefore the amount of lithium in the entire positive electrode active material does not change before and after the formation of the LWO.

That is, the ratio Li/Me in the lithium-nickel composite oxide particles serving as the core material decreases after the formation of the LWO as compared with before its formation. Therefore, better charge-discharge capacity and lower reaction resistance can be obtained by setting the ratio Li/Me in the entire positive electrode active material at 0.97 or more.

Accordingly, for obtaining higher battery capacity, the amount of lithium in the entire positive electrode active material is more preferably 0.97 to 1.15. Further, the ratio Li/Me of the lithium-nickel composite oxide particles serving as the core material is more preferably 0.95 to 1.15, further preferably 0.95 to 1.10.

The positive electrode active material of the present invention has output characteristics and cycle characteristics improved by providing lithium tungstate on the surface of the primary particles of the lithium-nickel composite oxide particles, and the powder characteristics as the positive electrode active material such as particle size and tap density need only to fall within the range of commonly used positive electrode active materials.

Further, the effect by providing the lithium tungstate on the surface of the primary particles of the lithium-nickel composite oxide particles is applicable, for example, not only to powders of lithium-cobalt composite oxide, lithium-manganese composite oxide, lithium-nickel-cobalt-manganese composite oxide, and the like, and the positive electrode active material described in the present invention, but also to commonly used positive electrode active materials for lithium secondary batteries.

(2) Method for Producing Positive Electrode Active Material

Hereinafter, a method for producing the positive electrode active material for nonaqueous electrolyte secondary batteries of the present invention will be described in detail for each step.

[Water Washing Step]

The water washing step is a step of obtaining a washed cake composed of washed lithium-nickel composite oxide particles by mixing, with water, a lithium-nickel composite oxide powder as a base material having a composition represented by the formula $Li_zNi_{1-x-y}Co_xM_yO_2$ (where $0 \leq x \leq 0.35$, $0 \leq y \leq 0.35$, and $0.95 \leq z \leq 1.30$ are satisfied, and M is at least one element selected from Mn, V, Mg, Mo, Nb, Ti, and Al) and having a layered crystal structure composed of primary particles and secondary particles formed by aggregation of the primary particles to form a slurry, followed by washing with water, filtration, and solid-liquid separation.

In lithium-nickel composite oxide powder, particularly, the lithium-nickel composite oxide powder obtained by sintering nickel composite hydroxide or nickel composite oxide with a lithium compound, an unreacted lithium compound is present on the surface of the secondary particles or the primary particles.

Accordingly, the excess of the unreacted lithium compound such as lithium hydroxide and lithium carbonate, sulfate radical, and other impurity elements, which deteriorate the battery characteristics, can be removed from the lithium-nickel composite oxide particles by washing with water.

Further, in the water washing step, water necessary for promoting the reaction between the lithium compound present on the surface of the primary particles of the lithium-nickel composite oxide and the tungsten compound can be given to the lithium-nickel composite oxide powder.

When washing the lithium-nickel composite oxide powder with water as above, the slurry concentration is preferably 500 to 2500 g/L, more preferably 750 to 2000 g/L. Here, the slurry concentration "g/L" means the amount "gram" of the lithium-nickel composite oxide particles to be mixed with 1 L of water.

If the slurry concentration is less than 750 g/L, the lithium compound that is present on the surface of the lithium-nickel composite oxide particles and is necessary for the reaction with the tungsten compound may also be washed away, and in the subsequent step, the reaction between the lithium compound and the tungsten compound may not sufficiently proceed.

Meanwhile, if the slurry concentration is over 1500 g/L, the unreacted lithium compound and the impurity elements may remain more than necessary, deteriorating the battery characteristics.

The water washing temperature is preferably 10 to 40° C., more preferably 20 to 30° C. If the water washing temperature is lower than 10° C., the lithium compound may remain more than necessary, deteriorating the battery characteristics. If the water washing temperature is higher than 40° C., the lithium compound may be washed away excessively.

The water washing time is not specifically limited, but is preferably about 5 to 60 minutes. If the water washing time is too short, the lithium compound and the impurities on the surface of the lithium-nickel composite oxide particles may not be sufficiently removed but remain there. Meanwhile, even if the water washing time is longer than noted above, the washing effect is not improved, and the productivity rather decreases.

The water used for forming the slurry is not specifically limited, but water with an electric conductivity as measured of less than 10 μS/cm is preferable, and water with an electric conductivity as measured of 1 μS/cm or less is more preferable, for preventing a reduction in battery characteristics due to deposition of impurities onto the positive electrode active material.

The method for solid-liquid separation after the washing with water is not specifically limited, and commonly used devices and methods are used. For example, a suction filter, a centrifuge, a filter press, or the like is preferably used.

Here, the cake composed of the washed lithium-nickel composite oxide particles obtained by the solid-liquid separation after the washing with water, that is, the washed cake has a water content of preferably 2.0 mass % or more, more preferably 3.0 to 15.0 mass %, more preferably 6.5 to 11.5 mass %.

At the water content of 2.0 mass % or more, the amount of water necessary for promoting the reaction between the lithium compound present on the surface of the washed lithium-nickel composite oxide particles and the tungsten compound can be more sufficient. Such a sufficient amount of water allows the tungsten compound to be dissolved and tungsten contained in the tungsten compound to penetrate into voids between the primary particles communicating with the outside of the secondary particles and incomplete grain boundaries together with water, so that a sufficient amount of tungsten can be dispersed on the surface of the primary particles.

Further, the water content is more preferably 3.0 to 15.0 mass %, further preferably 6.5 to 11.5 mass %, which can facilitate the mixing of the tungsten compound by suppressing an increase in viscosity of the washed cake when being slurried and can further improve the productivity by reducing the drying time. Further, when the positive electrode active material to be obtained is used as a positive electrode of a battery, deterioration in battery characteristics due to an increase in elution of lithium from the lithium-nickel composite oxide particles can be further suppressed.

[Mixing Step]

The mixing step is a step of obtaining a tungsten-containing mixture with the lithium-nickel composite oxide particles constituting the washed cake (which will be hereinafter referred to simply as "mixture") by mixing a tungsten compound powder free from lithium with the washed cake obtained in the water washing step.

The tungsten compound to be used is preferably water-soluble so as to be dissolved in water contained in the mixture, in order to penetrate to the surface of the primary particles inside the secondary particles. Further, the water in the mixture becomes alkaline due to the elution of lithium, and therefore the tungsten compound may be a compound soluble in alkaline water. Further, the mixture is heated in the subsequent heat treatment step, and therefore, even if the tungsten compound is difficult to be dissolved in water at room temperature, it needs only to be dissolved in water by heating in the heat treatment or by forming lithium tungstate through the reaction with the lithium compound on the surface of the lithium-nickel composite oxide particles.

Further, the dissolved tungsten compound needs only to be in an amount that allows the penetration to the surface of the primary particles inside the secondary particles, and therefore the tungsten compound may be partially solid after the mixing or after the heating.

In this way, the tungsten compound needs only to be free from lithium and to be soluble in water when heated in the heat treatment step, and tungsten oxide, tungstic acid, ammonium tungstate, sodium tungstate, or the like, is preferable, and tungsten oxide ($WO_3$) or tungstic acid ($WO_3.H_2O$), in which the possibility of impurity contamination is low, is more preferable.

Further, the amount of tungsten contained in the mixture is preferably 3.0 at % or less, more preferably 0.05 to 3.0 at %, further preferably 0.05 to 2.0 at %, particularly preferably 0.08 to 1.0 at %, with respect to the total number of atoms of Ni, Co, and M contained in the lithium-nickel composite oxide particles.

Thereby, the amount of tungsten contained in the lithium tungstate in the positive electrode active material is adjusted to the preferable range, and both high charge-discharge capacity and high output characteristics of the positive electrode active material can be further achieved.

Further, the washed cake is preferably mixed with the tungsten compound at a temperature of 50° C. or less.

If the temperature is over 50° C., the resulting mixture may not have a water content necessary for promoting the reaction between the lithium compound and the tungsten compound because they may be dried during the mixing.

For mixing the washed cake of the lithium-nickel composite oxide and the tungsten compound powder, a common mixer can be used. For example, the mixing may be performed sufficiently to an extent such that the shape of the lithium-nickel composite oxide particles is not broken, using a shaker mixer, a Loedige mixer, a Julia mixer, a V blender, or the like.

[Heat Treatment Step]

The heat treatment step is a step of heat-treating the tungsten-containing mixture and includes: a first heat treatment step of dispersing tungsten on the surface of the primary particles by allowing the lithium compound present on the surface of the primary particles of the lithium-nickel composite oxide to react with the tungsten compound so as to dissolve the tungsten compound therein; and a second heat treatment step of forming a lithium tungstate compound on the surface of the primary particles of the lithium-nickel composite oxide by performing heat treatment at a higher temperature than the heat treatment temperature in the first heat treatment step.

Here, use of the tungsten compound free from lithium and the first heat treatment step of dispersing tungsten on the surface of the primary particles by allowing the lithium compound to react with the tungsten compound so as to dissolve the tungsten compound therein are important.

In the first heat treatment step, heating the mixture containing the tungsten compound free from lithium allows not only lithium eluted in the mixture but also the lithium compound remaining on the surface of the primary particles of the lithium-nickel composite oxide particles to react with the tungsten compound to form the lithium tungstate. The formation of lithium tungstate can improve the battery characteristics by considerably reducing the excess lithium in the positive electrode active material to be obtained.

Further, there is also an effect of extracting excess lithium present in the lithium-nickel composite oxide particles, and the extracted lithium reacts with the tungsten compound to contribute to improvement in crystallinity of the lithium-nickel composite oxide particles when they serve as a positive electrode active material, so that the battery characteristics can be further enhanced.

The lithium tungstate formed by such a reaction is dissolved in water in the mixture and penetrates into the voids between the primary particles inside the secondary particles and the incomplete grain boundaries, so that tungsten can be dispersed on the surface of the primary particles.

For dispersing tungsten by allowing the lithium compound to react with the tungsten compound as described above, it is preferable that water remain until the reaction sufficiently proceeds and tungsten penetrates therein.

Accordingly, the first heat treatment step is performed at a heat treatment temperature of preferably 60 to 80° C.

If the temperature is less than 60° C., the lithium compound present on the surface of the primary particles of the lithium-nickel composite oxide may not sufficiently react with the tungsten compound to synthesize a necessary amount of lithium tungstate. Meanwhile, if the temperature is higher than 80° C., water may evaporate too rapidly to sufficiently progress the reaction of the lithium compound present on the surface of the primary particles with the tungsten compound and the penetration of tungsten.

The heating time in the first heat treatment step is not specifically limited, but is preferably 0.5 to 2 hours for allowing the lithium compound to react with the tungsten compound and tungsten to sufficiently penetrate therein.

The second heat treatment step is a step of forming a lithium tungstate compound on the surface of the primary particles of the lithium-nickel composite oxide particles by performing heat treatment at a higher temperature than the heat treatment temperature in the first heat treatment step to sufficiently evaporate water in the mixture, and the heat treatment temperature is preferably 100 to 200° C.

If the temperature is less than 100° C., the evaporation of water may be insufficient to sufficiently form the lithium tungstate compound. Meanwhile, if the temperature is over 200° C., necking between the lithium-nickel composite oxide particles may be formed via the lithium tungstate and/or the specific surface area of the lithium-nickel composite oxide particles may be reduced significantly, leading to degradation of the battery characteristics.

The heat treatment time in the second heat treatment step is not specifically limited, but is preferably 1 to 15 hours, more preferably 5 to 12 hours, for sufficiently evaporating water to form the lithium tungstate compound.

The heat treatment step is preferably performed in a decarboxylation air atmosphere, an inert gas atmosphere, or a vacuum atmosphere, for avoiding the reaction of water or carbonic acid in the atmosphere with lithium on the surface of the lithium-nickel composite oxide particles.

(3) Nonaqueous Electrolyte Secondary Battery

The nonaqueous electrolyte secondary battery of the present invention is constituted by a positive electrode, a negative electrode, a nonaqueous electrolyte, etc., and constituted by the same components as those of common nonaqueous electrolyte secondary batteries. The embodiment described below is just an example, and the nonaqueous electrolyte secondary battery of the present invention can be implemented by employing embodiments in which various changes and improvements are made, using the embodiment shown in this description as a base, based on the knowledge of those skilled in the art. Further, the applications of the nonaqueous electrolyte secondary battery of the present invention are not specifically limited.

(a) Positive Electrode

Using the positive electrode active material for nonaqueous electrolyte secondary batteries described above, the positive electrode of the nonaqueous electrolyte secondary battery is produced, for example, as follows.

First, a positive electrode active material in powder form, a conductive material, and a binder are mixed, and activated carbon and a solvent for its intended purpose such as a viscosity adjuster are further added, as needed, and the mixture is kneaded to produce a positive electrode composite material paste.

The mixing ratio of each component in the positive electrode composite material paste is also an important element to determine the performance of the nonaqueous electrolyte secondary battery. When the total mass of the solid contents of the positive electrode composite material excluding the solvent is taken as 100 parts by mass, it is preferable that the content of the positive electrode active material be 60 to 95 parts by mass, the content of the conductive material be 1 to 20 parts by mass, and the content of the binder be 1 to 20 parts by mass, as in a positive electrode of a common nonaqueous electrolyte secondary battery.

The obtained positive electrode composite material paste, for example, is applied to the surface of a current collector made of aluminum foil, followed by drying, to disperse the solvent. In order to enhance the electrode density, it may be pressed by roll pressing or the like, as needed. Thus, a positive electrode in sheet form can be produced.

The positive electrode in sheet form can be used for producing a battery, for example, by being cut into a suitable size corresponding to the intended battery. However, the method for producing the positive electrode is not limited to the aforementioned example, and another method may be employed.

For producing the positive electrode, graphite (such as natural graphite, artificial graphite, and expanded graphite) and carbon black materials such as acetylene black and Ketjen black (R), for example, can be used as the conductive material.

The binder serves to hold the active material particles, for which polyvinylidene fluoride (PVDF), polytetrafluoroethylene (PTFE), fluororubber, ethylene propylene diene rubber, styrene butadiene, cellulose resins, and polyacrylic acid, for example, can be used.

As needed, the positive electrode active material, the conductive material, and the activated carbon are dispersed, and a solvent to dissolve the binder is added to the positive electrode composite material.

Specifically, an organic solvent such as N-methyl-2-pyrrolidone can be used as the solvent. Further, activated carbon can be added to the positive electrode composite material for increasing the capacity of the electric double layer.

(b) Negative Electrode

As the negative electrode, a material formed by applying a negative electrode composite material formed into a paste by mixing the binder with metal lithium, lithium alloy, or the like, or a negative electrode active material capable of absorbing and desorbing lithium ions and adding a suitable solvent onto the surface of the current collector made of a metal foil such as copper, followed by drying and compressing for increasing the electrode density, as needed, is used.

As the negative electrode active material, a powder material of natural graphite, artificial graphite, a fired material of an organic compound such as a phenolic resin, and a carbon material such as cokes, for example, can be used. In this case, a fluorine-containing resin such as PVDF can be used as the negative electrode binder, as in the positive electrode, and an organic solvent such as N-methyl-2-pyrrolidone can be used as the solvent to disperse the active material and the binder therein.

(c) Separator

A separator is interposed between the positive electrode and the negative electrode.

The separator separates the positive electrode and the negative electrode from each other and holds the electrolyte. A thin film of polyethylene, polypropylene, or the like having a large number of fine holes can be used as the separator.

(d) Non-Aqueous Electrolyte

The nonaqueous electrolyte is formed by dissolving a lithium salt as a supporting salt in an organic solvent.

As the organic solvent used, one selected from cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butanesulton, and phosphorus compounds such as triethyl phosphate and trioctyl phosphate can be used alone, or two or more of these can be mixed for use.

As the supporting salt, $LiPF_6$, $LiBF_4$, $LiClO_4$, $LiAsF_6$, and $LiN(CF_3SO_2)_2$, and composite salts of these can be used.

Further, the non-aqueous electrolyte may contain a radical scavenger, a surfactant, a flame retardant, and the like.

(e) Shape and Configuration of Battery

The nonaqueous electrolyte secondary battery of the present invention constituted by the positive electrode, the negative electrode, the separator, and the non-aqueous electrolyte described above can have various shapes such as a cylindrical type and a stacked type.

Even if any shape is employed, an electrode body is obtained by stacking the positive electrode and the negative electrode via the separator, the obtained electrode body is impregnated with the non-aqueous electrolyte, the connection between the positive electrode current collector and the positive electrode terminal connected to the outside and the connection between the negative electrode current collector and the negative electrode terminal connected to the outside are established using leads for the current collectors, and the components are sealed in a battery case, to complete the nonaqueous electrolyte secondary battery.

(f) Characteristics

The nonaqueous electrolyte secondary battery using the positive electrode active material of the present invention has high capacity and high power.

In particular, the nonaqueous electrolyte secondary battery obtained by a further preferable embodiment using the positive electrode active material according to the present invention, for example, when used as a positive electrode of a 2032-type coin battery, has a high initial discharge capacity of 165 mAh/g or more and a low positive electrode resistance and further has high capacity and high power. Further, it also has high thermostability and excellent safety.

The method for measuring the positive electrode resistance in the present invention is exemplified, as follows.

When the frequency dependence of a battery reaction is measured by a common AC impedance method as an electrochemical evaluation technique, a Nyquist diagram based on the solution resistance, the negative electrode resistance and the negative electrode capacity, and the positive electrode resistance and the positive electrode capacity is obtained as shown in FIG. 1.

The battery reaction in an electrode is made by the resistance components following charge transfers and the capacity components by an electric double layer. When these components are shown as an electrical circuit, a parallel circuit of the resistance and the capacity is obtained, and they are shown as an equivalent circuit in which the solution resistance and the parallel circuit of the negative electrode and the positive electrode are connected in series as the entire battery.

The Nyquist diagram determined is subjected to fitting calculation using the equivalent circuit, and the resistance components and the capacity components each can be estimated.

The positive electrode resistance is equal to the diameter of a semicircle on the low frequency side of the Nyquist diagram to be obtained.

From above, the positive electrode resistance can be estimated by performing the AC impedance measurement on the produced positive electrode and subjecting the obtained Nyquist diagram to fitting calculation using the equivalent circuit.

EXAMPLES

For a secondary battery having a positive electrode using the positive electrode active material obtained by the present invention, the performance (such as initial discharge capacity, positive electrode resistance and cycle characteristics) was measured.

Hereinafter, the present invention will be specifically described by way of examples, but the present invention is not limited to these examples at all.

(Production and Evaluation of Battery)

For evaluating the positive electrode active material, a 2032-type coin battery 1 (which will be hereinafter referred to as coin type battery) shown in FIG. 2 was used.

Figure 2:
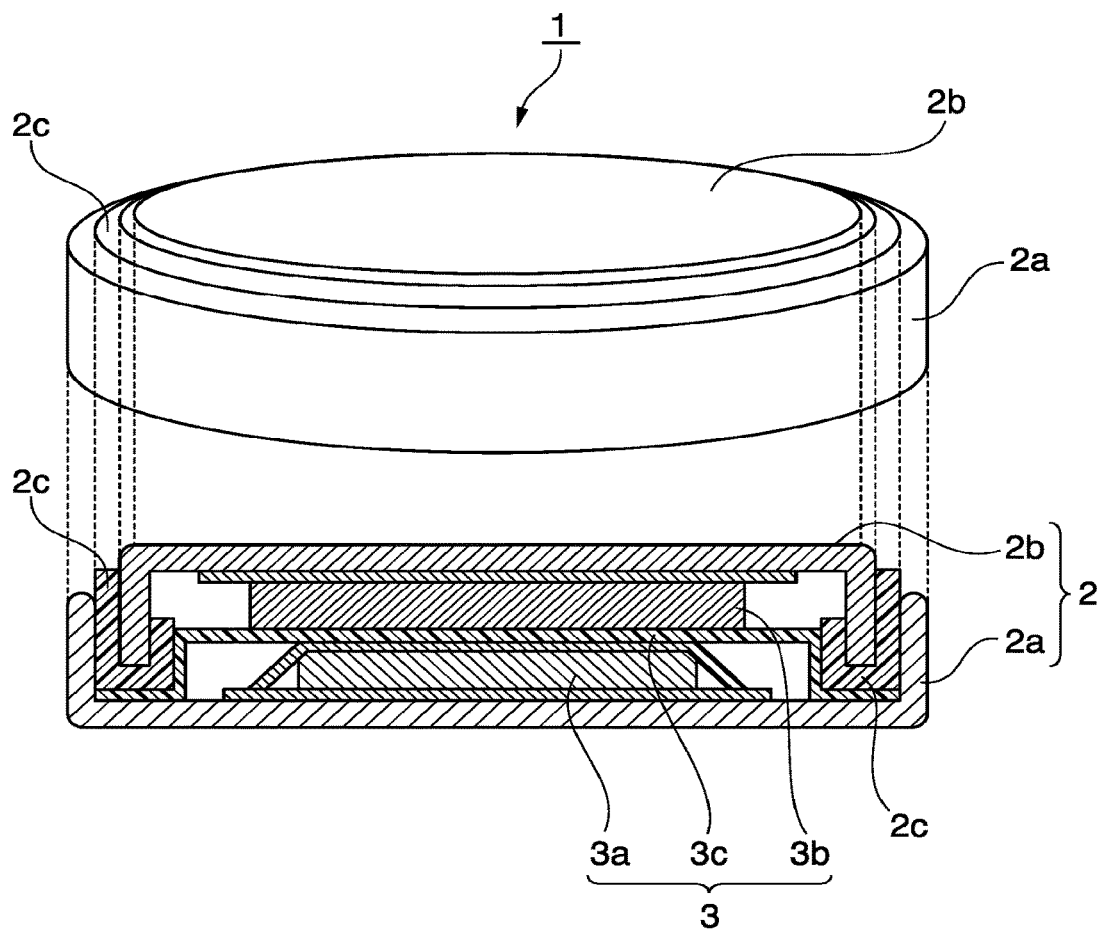
FIG. 2 is a schematic sectional view of a coin battery 1 used for battery evaluation.

As shown in FIG. 2, the coin type battery 1 is constituted by a case 2 and electrodes 3 housed in the case 2.

The case 2 has a hollow positive electrode can 2a with one end open and a negative electrode can 2b arranged in the opening of the positive electrode can 2a, and is configured so that, when the negative electrode can 2b is arranged in the opening of the positive electrode can 2a, a space to house the electrodes 3 is formed between the negative electrode can 2b and the positive electrode can 2a.

The electrodes 3 are constituted by a positive electrode 3a, a separator 3c, and a negative electrode 3b, which are stacked to be aligned in this order and are housed in the case 2 so that the positive electrode 3a is in contact with the inner surface of the positive electrode can 2a, and the negative electrode 3b is in contact with the inner surface of the negative electrode can 2b.

The case 2 includes a gasket 2c, and the relative movement between the positive electrode can 2a and the negative electrode can 2b is fixed by the gasket 2c so that the non-contact state is maintained. Further, the gasket 2c also has a function of sealing the gap between the positive electrode can 2a and the negative electrode can 2b so as to block between the inside and the outside of the case 2 air-tightly and liquid-tightly.

The coin type battery 1 shown in FIG. 2 was fabricated as follows.

First, 52.5 mg of the positive electrode active material for nonaqueous electrolyte secondary batteries, 15 mg of acetylene black, and 7.5 mg of polytetrafluoroethylene resin (PTFE) were mixed, followed by press molding at a pressure of 100 MPa to a diameter of 11 mm and a thickness of 100 µm, to produce the positive electrode 3a. The thus produced positive electrode 3a was dried in a vacuum dryer at 120° C. for 12 hours.

Using the positive electrode 3a, the negative electrode 3b, the separator 3c, and the electrolyte, the coin type battery 1 shown in FIG. 2 was produced in a glove box under Ar atmosphere with the dew point controlled to −80° C.

As the negative electrode 3b, a negative electrode sheet in which graphite powder with an average particle size of about 20 µm and polyvinylidene fluoride were applied to a copper foil and which was punched into a disk shape with a diameter of 14 mm was used.

As the separator 3c, a polyethylene porous film with a film thickness of 25 µm was used. As the electrolyte, an equal mixture (manufactured by TOMIYAMA PURE CHEMICAL INDUSTRIES, LTD.) of ethylene carbonate (EC) and diethyl carbonate (DEC) with 1 M $LiClO_4$ serving as a supporting electrolyte was used.

The initial discharge capacity and the positive electrode resistance showing the performance of the thus produced coin type battery 1 were evaluated as follows.

The capacity when the coin type battery 1 allowed to stand for about 24 hours from the fabrication was charged, with the current density with respect to the positive electrode set to 0.1 $mA/cm^2$, to a cut-off voltage of 4.3 V after the OCV (Open Circuit Voltage) became stable, followed by a pause for one hour, and was discharged to a cut-off voltage of 3.0 V was taken as the initial discharge capacity.

The Nyquist plot shown in FIG. 1 is obtained by charging the coin type battery 1 at a charge potential of 4.1 V and measuring the positive electrode resistance using a frequency response analyzer and a potentio-galvanostat (1255B, manufactured by Solartron) by the AC impedance method.

Since the Nyquist plot is shown as the sum of characteristic curves showing the solution resistance, the negative electrode resistance and the capacity thereof, and the positive electrode resistance and the capacity thereof, fitting calculation was performed based on the Nyquist plot using the equivalent circuit to calculate the value of the positive electrode resistance.

The cycle characteristics were evaluated based on the capacity retention rate and the rate of increase in positive electrode resistance after a cycle test. The cycle test was performed by measuring the initial discharge capacity, followed by a 10-minute pause, and thereafter repeating the charge and discharge cycle, in the same manner as in the measurement of the initial discharge capacity, 500 times (charge and discharge) including the measurement of the initial discharge capacity. The discharge capacity at the 500th cycle was measured, and the percentage of the discharge capacity at the 500th cycle with respect to the discharge capacity (initial discharge capacity) at the 1st cycle was determined as capacity retention rate (%). Further, the positive electrode resistance after the 500 cycles was measured and was evaluated based on the rate of increase (fold) from the positive electrode resistance before the cycle test.

In the present examples, the positive electrode active material, and the secondary battery, the respective samples of special reagents manufactured by Wako Pure Chemical Industries, Ltd. were used for producing the composite hydroxide.

Example 1

A powder of lithium-nickel composite oxide particles represented by $Li_{1.025}Ni_{0.91}Co_{0.06}Al_{0.03}O_2$ and obtained by a known technique of mixing an oxide containing Ni as a main component and lithium hydroxide followed by firing was used as a base material.

100 mL of pure water at 25° C. was added to 150 g of the base material to form a slurry, followed by washing with water for 15 minutes. After the washing with water, solid-liquid separation was performed by filtration using a Buchner funnel. The washed cake had a water content of 8.5 mass %.

Next, 1.08 g of tungsten oxide ($WO_3$) was added to the washed cake so that the amount of W was 0.30 at % with respect to the total number of atoms of Ni, Co, and Al contained in the lithium-nickel composite oxide, and the mixture was sufficiently mixed using a shaker mixer (TURBULA TypeT2C, manufactured by Willy A. Bachofen AG) to obtain a mixed powder.

The obtained mixed powder was put into an aluminum bag, which was purged with a nitrogen gas, followed by lamination, and was put into a dryer heated to 80° C. for about 1 hour. After the heating, it was taken out of the aluminum bag and was replaced into a SUS container, followed by static drying using a vacuum dryer heated to 190° C. for 10 hours and thereafter cooling in a furnace.

Finally, a sieve with a mesh opening of 38 μm was applied for deagglomeration, to obtain a positive electrode active material having a lithium tungstate compound on the surfaces of the primary particles.

The obtained positive electrode active material was analyzed by the ICP method, and it was confirmed that the tungsten content was 0.30 at % with respect to the total number of atoms of Ni, Co, and Al, and the ratio Li/Me was 0.99. Further, the content of sulfate radical as determined by conversion from the sulfur content measured by the ICP method was 0.01 mass %.

[Analysis of Excess Lithium]

Excess lithium in the obtained positive electrode active material was evaluated by titrating Li eluted from the positive electrode active material. As a result of evaluating the excess amount of lithium by analyzing the compound state of lithium eluted from the neutralization point appearing by adding pure water to the obtained positive electrode active material, followed by stirring for a certain time, and thereafter adding hydrochloric acid while measuring the pH of the filtrate after filtration, the excess amount of lithium was 0.02 mass % with respect to the total amount of the positive electrode active material.

[Morphological Analysis of Lithium Tungstate]

The obtained positive electrode active material was embedded into a resin, and cross-section polishing was performed thereon to produce a sample for observation. The cross section of the sample was observed by SEM at 5000-fold magnification, and it was confirmed that the sample was constituted by primary particles and secondary particles formed by aggregation of the primary particles, fine particles of lithium tungstate were formed on the surface of the primary particles thereof. The fine particles had a particle size of 20 to 150 nm.

Further, it was confirmed that 85% of the number of the observed secondary particles had lithium tungstate formed on the surface of the primary particles, and the lithium tungstate was uniformly formed between the secondary particles.

Further, the vicinity of the surface of the primary particles of the obtained positive electrode active material was observed by a transmission electron microscope (TEM), and it was confirmed that coating films with a film thickness of 2 to 65 nm were formed on the surface of the primary particles, and the coating films were the lithium tungstate.

[Evaluation of Battery]

The battery characteristics of the coin type battery 1 shown in FIG. 2 having a positive electrode produced using the obtained positive electrode active material were evaluated. The positive electrode resistance before the cycle test was shown as a relative value, taking the evaluation value of Example 1 as "1.00". The initial discharge capacity was 216 mAh/g.

Hereinafter, for Examples and Comparative Examples, only materials and conditions changed from those in Example 1 above are shown. Further, Table 1 shows the conditions in Example 1 from the water washing step to the heat treatment step, and Table 2 shows the evaluation results.

Example 2

A positive electrode active material was obtained and was evaluated in the same manner as in Example 1 except that 0.52 g of tungsten oxide ($WO_3$) was added to the washed cake so that the amount of W was 0.15 at % with respect to the total number of atoms of Ni, Co, and Al contained in the lithium-nickel composite oxide.

Table 1 and Table 2 show the results.

Example 3

A positive electrode active material was obtained and was evaluated in the same manner as in Example 1 except that 0.36 g of tungsten oxide ($WO_3$) was added to the washed cake so that the amount of W was 0.10 at % with respect to the total number of atoms of Ni, Co, and Al contained in the lithium-nickel composite oxide.

Table 1 and Table 2 show the results.

Example 4

A positive electrode active material was obtained and was evaluated in the same manner as in Example 1 except that 150 mL of pure water at 25° C. was added to 150 g of the base material to form a slurry, and 0.54 g of tungsten oxide ($WO_3$) was added to the washed cake so that the amount of W was 0.15 at % with respect to the total number of atoms of Ni, Co, and Al contained in the lithium-nickel composite oxide.

Table 1 and Table 2 show the results.

Example 5

A positive electrode active material was obtained and was evaluated in the same manner as in Example 1 except that 200 mL of pure water at 25° C. was added to 150 g of the base material to form a slurry, and 0.54 g of tungsten oxide ($WO_3$) was added to the washed cake so that the amount of W was 0.15 at % with respect to the total number of atoms of Ni, Co, and Al contained in the lithium-nickel composite oxide.

Table 1 and Table 2 show the results.

Example 6

A positive electrode active material was obtained and was evaluated in the same manner as in Example 1 except that 100 mL of pure water at 40° C. was added to 150 g of the base material to form a slurry, and 0.54 g of tungsten oxide ($WO_3$) was added to the washed cake so that the amount of W was 0.15 at % with respect to the total number of atoms of Ni, Co, and Al contained in the lithium-nickel composite oxide.

Table 1 and Table 2 show the results.

Example 7

A positive electrode active material was obtained and was evaluated in the same manner as in Example 1 except that the conditions for filtration using the Buchner funnel after the washing with water were adjusted so that the washed cake after the solid-liquid separation had a water content of 2.5 mass %, and 0.54 g of tungsten oxide ($WO_3$) was added to the washed cake so that the amount of W was 0.15 at % with respect to the total number of atoms of Ni, Co, and Al contained in the lithium-nickel composite oxide.

Table 1 and Table 2 show the results.

Comparative Example 1

A positive electrode active material was obtained and was evaluated in the same manner as in Example 1 except that 200 mL of pure water at 25° C. was added to 150 g of the base material to form a slurry, and the tungsten compound was not added to the washed cake after the solid-liquid separation.

Table 1 and Table 2 show the results.

Comparative Example 2

A positive electrode active material was obtained and was evaluated in the same manner as in Example 1 except that 200 mL of pure water at 25° C. was added to 150 g of the base material to form a slurry, and lithium tungstate (LWO: $Li_2WO_4$) was added to the washed cake so that the amount of W was 0.15 at % with respect to the total number of atoms of Ni, Co, and Al contained in the lithium-nickel composite oxide.

Table 1 and Table 2 show the results.

TABLE 1

|  | Slurry concentration [g/L] | Water temperature [° C.] | Water content [mass %] | W source*[1] | First heat treatment temperature [° C.] | Second heat treatment temperature [° C.] |
| --- | --- | --- | --- | --- | --- | --- |
| Example 1 | 1500 | 25 | 8.5 | $WO_3$ | 80 | 190 |
| Example 2 | 1500 | 25 | 8.5 | $WO_3$ | 80 | 190 |
| Example 3 | 1500 | 25 | 8.5 | $WO_3$ | 80 | 190 |
| Example 4 | 1000 | 25 | 8.2 | $WO_3$ | 80 | 190 |
| Example 5 | 750 | 25 | 8.2 | $WO_3$ | 80 | 190 |
| Example 6 | 1500 | 40 | 8.3 | $WO_3$ | 80 | 190 |
| Example 7 | 1500 | 25 | 2.5 | $WO_3$ | 80 | 190 |
| Comparative Example 1 | 750 | 25 | 9.5 | — | 80 | 190 |
| Comparative Example 2 | 750 | 25 | 8.5 | LWO | 80 | 190 |

*[1]Although LWO had no significant difference in initial battery characteristics from $WO_3$, the battery characteristics decreased after cycles (500 cycles).

TABLE 2

|  |  |  |  | LWO on surface of primary particles | | | Initial discharge capacity [mAh/g] | Positive electrode resistance before cycles *[2] | After 500 cycles | |
|  | Amount of W [mass %] | Content of sulfate radical [mass %] | Excess Li [mass %] | Form | Particle size [nm] | Film thickness [nm] |  |  | Capacity retention rate [%] | Rate of increase in positive electrode resistance *[3] |
| --- | --- | --- | --- | --- | --- | --- | --- | --- | --- | --- |
| Example 1 | 0.30 | 0.01 | 0.02 | Thin film + Fine particles | 20 to 150 | 2 to 65 | 216 | 1.00 | 85 | 12 |
| Example 2 | 0.15 | 0.01 | 0.02 | Thin film + Fine particles | 10 to 120 | 1 to 55 | 218 | 0.91 | 86 | 12 |
| Example 3 | 0.10 | 0.01 | 0.03 | Thin film | — | 1 to 55 | 217 | 0.91 | 86 | 12 |
| Example 4 | 0.15 | 0.01 | 0.02 | Thin film + Fine particles | 20 to 160 | 2 to 60 | 219 | 0.95 | 87 | 11 |
| Example 5 | 0.15 | 0.02 | 0.02 | Thin film | — | 2 to 70 | 215 | 1.00 | 85 | 12 |
| Example 6 | 0.15 | 0.01 | 0.005 | Thin film + Fine particles | 10 to 145 | 1 to 55 | 215 | 1.00 | 83 | 12 |
| Example 7 | 0.15 | 0.01 | 0.04 | Thin film + Fine particles | 10 to 140 | 1 to 55 | 215 | 1.02 | 82 | 13 |
| Comparative Example 1 | 0.00 | 0.02 | 0.03 | — | — | — | 204 | 4.32 | 73 | 45 |

TABLE 2-continued

| | Content of | | | LWO on surface of primary particles | | Initial | Positive electrode | Capacity | After 500 cycles Rate of increase in |
| | | | | | | | | | |
| | Amount of W [mass %] | sulfate radical [mass %] | Excess Li [mass %] | Form | Particle size [nm] | Film thickness [nm] | discharge capacity [mAh/g] | resistance before cycles *2 | retention rate [%] | positive electrode resistance *3 |
|---|---|---|---|---|---|---|---|---|---|---|
| Comparative Example 2 | 0.15 | 0.02 | 0.06 | Thin film + Fine particles | 20 to 215 | 2 to 105 | 215 | 1.09 | 81 | 15 |

*2 Reaction resistance before cycles was calculated taking Example 1 as 1.00.
*3 Rate of increase in reaction resistance = Reaction resistance after cycles/Reaction resistance before cycles

[Evaluation]

As is obvious from Table 1 and Table 2, the positive electrode active materials of Examples 1 to 7 were produced according to the present invention and therefore had high initial discharge capacity and low positive electrode resistance, as compared with Comparative Examples, and they formed batteries having good cycle characteristics and excellent characteristics.

Figure 3:
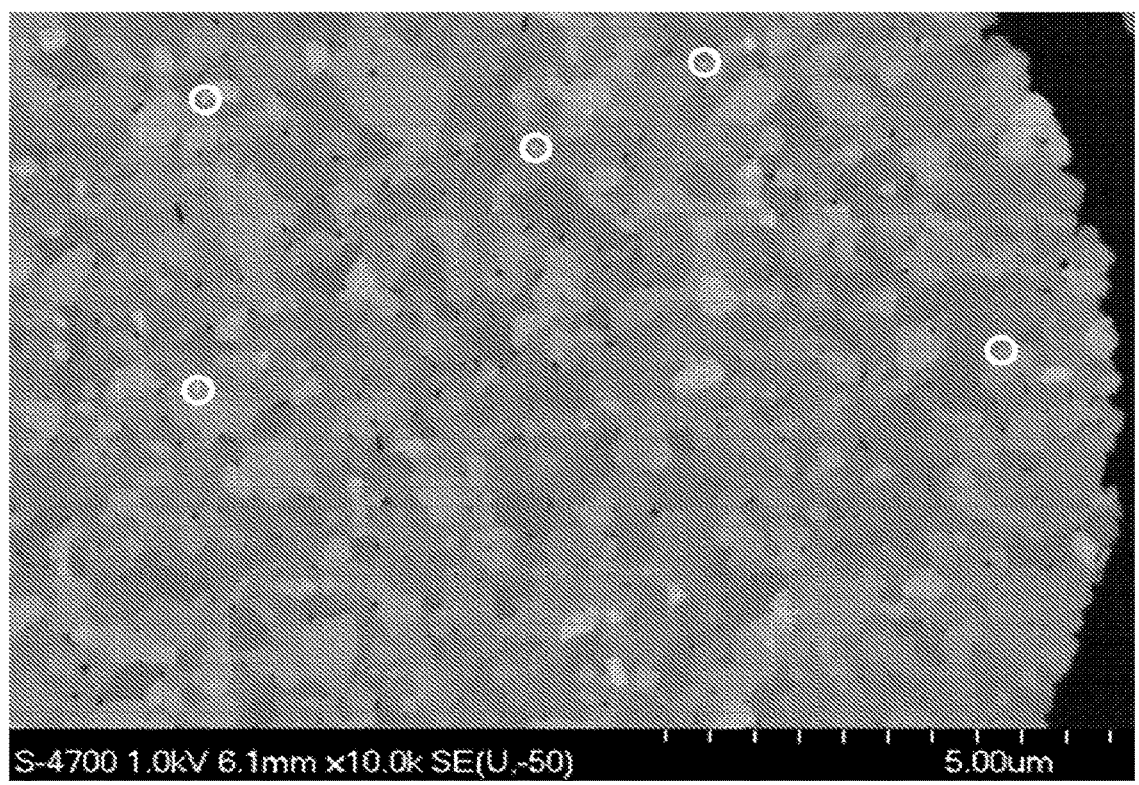
FIG. 3 is a cross-sectional SEM image (observed at 10000-fold magnification) of a lithium-nickel composite oxide of the present invention.

Further, FIG. 3 shows an example of the results of the cross sectional SEM observation of the positive electrode active materials obtained in Examples of the present invention, where it was confirmed that such a positive electrode active materials thus obtained was composed of primary particles and secondary particles formed by aggregation of the primary particles, and lithium tungstate was formed on the surface of the primary particles. FIG. 3 shows the positions where the lithium tungstate compound was observed by circles.

In Example 6, since the water washing temperature was as high as 40° C., the washed amount of the lithium compound present on the surface of the primary particles of the lithium-nickel composite oxide necessary for the reaction with the tungsten compound increased, and lithium extracted from the crystals of the lithium-nickel composite oxide in forming the lithium tungstate compound increased to reduce the crystallinity, resulting in a slight decrease in capacity retention rate in the cycle test.

In Example 7, since the washed cake had low water content, the reaction of the lithium compound present on the surface of the primary particles of the lithium-nickel composite oxide with the tungsten compound was insufficient, the formation of the lithium tungstate compound was reduced, the dispersibility decreased, and further excess lithium slightly increased, therefore resulting in a slight reduction in output characteristics and battery characteristics in the cycle test.

In contrast, in Comparative Example 1, since the lithium tungstate according to the present invention was not formed on the surface of the primary particles, the positive electrode resistance was considerably high, and thus it is difficult to satisfy the requirements of power enhancement.

Further, in Comparative Example 2, since lithium tungstate was added to the washed cake, excess lithium in the positive electrode active material increased, resulting in a reduction in output characteristics and battery characteristics in the cycle test.

The nonaqueous electrolyte secondary battery of the present invention is suitable for power sources of small portable electronic devices (such as laptop personal computers and mobile phone terminals) that constantly require high capacity and is suitable for batteries for electric cars that require high power.

Further, the nonaqueous electrolyte secondary battery of the present invention has excellent safety and allows size reduction and power enhancement, and therefore it is suitable as a power source for electric cars where there is a restriction on the mounting space. The present invention can be used not only as a power source for electric cars which are purely driven by electric energy but also as a power source for so-called hybrid vehicles that is used in combination with a combustion engine such as a gasoline engine and a diesel engine.

REFERENCE SIGNS LIST

1: Coin type battery
2: Case
2a: Positive electrode can
2b: Negative electrode can
2c: Gasket
3: Electrode
3a: Positive electrode
3b: Negative electrode
3c: Separator

What is claimed is:

1. A method of producing a positive electrode active material for nonaqueous electrolyte secondary batteries, comprising
   a water washing step of mixing, with water, a lithium-nickel composite oxide powder represented by a general formula: $Li_zNi_{1-x-y}Co_xM_yO_2$, where $0 \leq x \leq 0.35$, $0 \leq y \leq 0.35$, and $0.95 \leq z \leq 1.30$ are satisfied, and M is at least one element selected from Mn, V, Mg, Mo, Nb, Ti, and Al, the lithium-nickel composite oxide powder having a layered crystal structure composed of primary particles and secondary particles formed by aggregation of the primary particles to form a slurry, and the water washing step including washing the lithium-nickel composite oxide powder with the water, and then subjecting the slurry to solid-liquid separation to obtain a washed cake constituted by washed lithium-nickel composite oxide particles;
   a mixing step of mixing a tungsten compound powder not containing lithium with the washed cake to obtain a tungsten-containing mixture; and
   a heat treatment step of heating the tungsten-containing mixture, wherein
   the heat treatment step includes:
   a first heat treatment step of heating the tungsten-containing mixture to allow a lithium compound present on a surface of the primary particles of the washed lithium-nickel composite oxide to react with the tungsten compound so as to dissolve the tungsten compound therein, thereby forming lithium-nickel composite oxide particles with tungsten dispersed on the surface of the primary particles; and subsequent to the first heat treatment step, a second heat treatment step of performing heat treatment at a higher temperature than in the first heat treatment step to form lithium-nickel composite oxide particles with a lithium tungstate compound formed on the surface of the primary particles of the lithium-nickel composite oxide.

2. The method of producing a positive electrode active material for nonaqueous electrolyte secondary batteries according to claim 1, wherein
the slurry in the water washing step has a concentration of 500 to 2500 g/L.

3. The method of producing a positive electrode active material for nonaqueous electrolyte secondary batteries according to claim 1, wherein
the slurry in the water washing step has a temperature of 20 to 30° C.

4. The method of producing a positive electrode active material for nonaqueous electrolyte secondary batteries according to claim 1, wherein
the washed cake obtained in the water washing step has a water content controlled to 3.0 to 15.0 mass %.

5. The method of producing a positive electrode active material for nonaqueous electrolyte secondary batteries according to claim 1, wherein
the tungsten compound not containing lithium used in the mixing step is tungsten oxide ($WO_3$) or tungstic acid ($WO_3.H_2O$).

6. The method of producing a positive electrode active material for nonaqueous electrolyte secondary batteries according to claim 1, wherein
an amount of tungsten contained in the tungsten-containing mixture is 0.05 to 2.0 at % with respect to the total number of atoms of Ni, Co, and M contained in the lithium-nickel composite oxide particles.

7. The method of producing a positive electrode active material for nonaqueous electrolyte secondary batteries according to claim 1, wherein
the heat treatment step is performed in any one atmosphere of decarbonated air, inert gas, and vacuum.

8. The method of producing a positive electrode active material for nonaqueous electrolyte secondary batteries according to claim 1, wherein
the first heat treatment step is performed at a heat treatment temperature of 60 to 80° C.

9. The method of producing a positive electrode active material for nonaqueous electrolyte secondary batteries according to claim 1, wherein
the second heat treatment step is performed at a heat treatment temperature of 100 to 200° C.

* * * * *